(12) United States Patent
Hou et al.

(10) Patent No.: US 12,466,747 B2
(45) Date of Patent: Nov. 11, 2025

(54) METHODS OF RECOVERING BARIUM FROM PRODUCED WATER TO REMOVE SULFATES IN SEAWATER FOR OILFIELD APPLICATIONS

(71) Applicant: SAUDI ARABIAN OIL COMPANY, Dhahran (SA)

(72) Inventors: Jian Hou, Beijing (CN); Tianpiang Huang, Beijing (CN); Fahd Ibrahim Alghunaimi, Dhahran (SA); Norah W. Aljuryyed, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/709,769

(22) PCT Filed: Mar. 29, 2023

(86) PCT No.: PCT/CN2023/084685
§ 371 (c)(1),
(2) Date: May 13, 2024

(87) PCT Pub. No.: WO2024/197637
PCT Pub. Date: Oct. 3, 2024

(65) Prior Publication Data
US 2025/0128971 A1    Apr. 24, 2025

(51) Int. Cl.
*C02F 1/52* (2023.01)
*B01J 20/16* (2006.01)
(Continued)

(52) U.S. Cl.
CPC ............. *C02F 1/5236* (2013.01); *B01J 20/16* (2013.01); *B01J 20/28004* (2013.01);
(Continued)

(58) Field of Classification Search
CPC ......... E21B 21/068; E21B 43/26; C09K 3/22; C09K 5/066; C09K 8/04; C09K 8/504;
(Continued)

(56) References Cited

U.S. PATENT DOCUMENTS 5,035,807 A * 7/1991 Maree ...................... C02F 1/62
210/912
6,482,380 B1   11/2002 Nenoff et al.
(Continued)

FOREIGN PATENT DOCUMENTS

AU   2002364181 A1   7/2004
CN     102448571 A   5/2012
(Continued)

OTHER PUBLICATIONS

International Search Report and Written Opinion issued in corresponding PCT Application No. PCT/CN2024/074649, mailed Oct. 28, 2024 (9 pages).
(Continued)

*Primary Examiner* — Zakiya W Bates
(74) *Attorney, Agent, or Firm* — Osha Bergman Watanabe & Burton LLP

(57) ABSTRACT

A method for removing sulfates from seawater by immersing a barium adsorbent into produced water to adsorb the barium ions from the produced water. The adsorbent is combined with an acidic solution that pulls the barium ions into the acidic solution. The acidic solution containing barium ions is combined with seawater to precipitate the sulfate as barium sulfate ($BaSO_4$).

18 Claims, 3 Drawing Sheets

(51) Int. Cl.

| | | |
|---|---|---|
| *B01J 20/28* | (2006.01) | |
| *C02F 1/28* | (2023.01) | |
| *C02F 1/66* | (2023.01) | |
| *C02F 101/10* | (2006.01) | |
| *C02F 103/08* | (2006.01) | |
| *C02F 103/10* | (2006.01) | |
| *E21B 21/06* | (2006.01) | |
| *E21B 43/26* | (2006.01) | |

(52) U.S. Cl.
CPC ......... *B01J 20/28007* (2013.01); *C02F 1/281* (2013.01); *C02F 1/66* (2013.01); *E21B 43/26* (2013.01); *C02F 2101/101* (2013.01); *C02F 2103/08* (2013.01); *C02F 2103/10* (2013.01); *C02F 2303/16* (2013.01)

(58) Field of Classification Search
CPC . C09K 8/536; C09K 8/57; C09K 8/66; C09K 8/72; C09K 8/84; C02F 1/281; C02F 1/28; C02F 1/5236; C02F 1/52; C02F 1/66; B01J 20/28004
See application file for complete search history.

(56) References Cited

U.S. PATENT DOCUMENTS

| | | |
|---|---|---|
| 10,442,713 B2 | 10/2019 | Bagatin et al. |
| 2009/0050839 A1 | 2/2009 | Chen et al. |
| 2018/0250651 A1 | 9/2018 | Sarp et al. |
| 2020/0398252 A1 | 12/2020 | Ma et al. |

FOREIGN PATENT DOCUMENTS

| | | |
|---|---|---|
| CN | 103894161 A | 7/2014 |
| CN | 105597685 A | 5/2016 |
| CN | 105771936 A | 7/2016 |
| CN | 107042087 A | 8/2017 |
| CN | 109806844 A | 5/2019 |
| CN | 111375386 A | 7/2020 |
| CN | 113828284 A | 12/2021 |
| CN | 115228440 A | 10/2022 |
| CN | 115703060 A | 2/2023 |
| CN | 115722212 A | 3/2023 |
| CN | 116930146 A | 10/2023 |
| GB | 366429 A | 2/1932 |
| JP | S61187939 A | 8/1986 |
| JP | 2002267796 A | 9/2002 |
| JP | 2003236371 A | 8/2003 |
| JP | 2009096681 A | 5/2009 |
| JP | 2018061922 A | 4/2018 |
| JP | 2018061925 A | 4/2018 |
| WO | 2013006235 A1 | 1/2013 |

OTHER PUBLICATIONS

International Search Report and Written Opinion issued in corresponding PCT Application No. PCT/CN2024/074700, mailed Sep. 24, 2024 (8 pages).

Majid et al., "Seawater based fracturing fluid: a game changer in hydraulic fracturing applications in Saudi Arabia," The SPE Middle East Oil & Gas Show and Conference held in Manama, Kingdom of Bahrain, Mar. 6-9, 2017, SPE-184015-MS, 15 pages.

Benatti et al., "Sulfate removal from waste chemicals by precipitation," Journal of Environmental Management, Jan. 28, 2008, 504-511, 8 pages.

Krebs et al., Solving the operational challenges of sulfate removal units using high-flux, fouling-resistant nanofiltration membranes. The Offshore Technology Conference held in Houston, Texas, USA, May 6-9, 2019. OTC-29532-MS, 11 pages.

Kartic et al., "Removal of high concentration of sulfate from pigment industry effluent by chemical precipitation using barium chloride: RSM and ANN modeling approach," Journal of Environmental Management, Oct. 8, 2017, pp. 69-76, 8 pages.

Fard et al., "Barium removal from synthetic natural and produced water using MXene as two dimensional (2-D) nanosheet adsorbent," Chemical Engineering Journal, Feb. 16, 2017, 42 pages.

Kang et al., "Sulfate-rich metal-organic framework for high efficiency and selective removal of barium from nuclear wastewater," I&EC Research, Oct. 24, 2017, 31 pages.

International Search Report Issued in Corresponding PCT Application No. PCT/CN2023/084685, Mailed Dec. 26, 2023, 4 pages.

Written Opinion Issued in Corresponding PCT Application No. PCT/CN2023/084685, Mailed Dec. 26, 2023, 4 pages.

\* cited by examiner

METHODS OF RECOVERING BARIUM FROM PRODUCED WATER TO REMOVE SULFATES IN SEAWATER FOR OILFIELD APPLICATIONS

BACKGROUND

The presence of sulfate ions in seawater often leads to scaling and formation damage in upstream oil and gas applications when combined with high concentrations of calcium, barium or strontium, which are often found in formation waters. Current technologies used for removal of sulfates from seawater include reverse osmosis, nano-filtration, ion exchange and chemical precipitations. Among these technologies, chemical precipitations are cost-effective and efficient, and do not require a large energy input. In particular, precipitation with barium is an effective method used to remove sulfates.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method to remove sulfates from seawater by combining barium ions with seawater to precipitate the sulfate out as barium sulfate (BaSO4). The barium ions are adsorbed from produced water with a pH between 7 to 10. These barium ions are adsorbed by the barium adsorbent, and immersed in an acidic solution to release the barium ions from the adsorbent. This acidic solution is combined with seawater to facilitate the precipitation reaction that will form barium sulfate and thus provide a mechanism to remove sulfates from the seawater.

In another aspect, embodiments disclosed herein relate to a method. The method includes recovering produced waters comprising barium ions from an underground reservoir and adjusting a pH of the produced waters to a pH in a range from 7 to 10 to form a pH adjusted produced water. The pH adjusted produced water is contacted with a barium adsorbent to produce a barium adsorbent including adsorbed barium ions and a produced water having a reduced barium content. The barium adsorbent including adsorbed barium ions is contacted with an acidic solution to produce an acidic solution including barium ions and a regenerated barium adsorbent. The acidic solution containing barium ions is mixed with seawater comprising sulfate ions to recover a barium sulfate precipitate and a reduced sulfate seawater.

Other aspects and advantages of the claimed subject matter will be apparent from the following description and the appended claims.

DETAILED DESCRIPTION

In oil and gas production processes, underground barium ions are produced with formation water. As such, produced water can have a barium ion concentration of up to thousands of ppm (part per million). The present disclosure relates to methods of collecting barium from produced water and subsequently using the collected barium to remove sulfates in seawater for oilfield applications.

Figure 1:
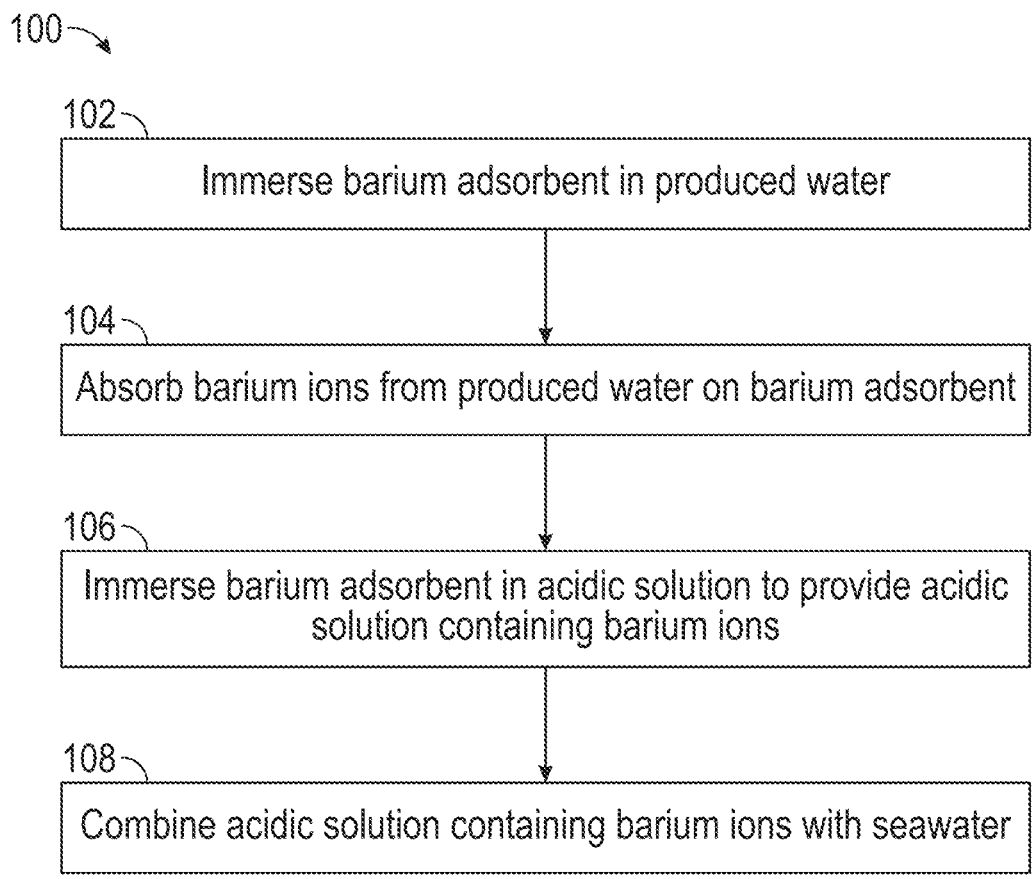
FIG. 1 is a block-flow diagram of method in accordance with one or more embodiments of the present disclosure.

In one aspect, embodiments disclosed herein relate to a method of removing sulfates from seawater. The method may include recovering barium ions from produced water, forming an acidic solution containing barium ions, and mixing the acidic solution containing barium ions with seawater to precipitate out sulfate. The method may further include, after precipitating out sulfate from the seawater, mixing the treated seawater with an injection fluid for use in various oil and gas processes. Notably, methods of one or more embodiments, adsorbing barium to a barium adsorbent and subsequently desorbing the barium ions from the barium adsorbent provide a regenerated barium adsorbent that may be used for multiple iterations of the method. A non-limiting method, 100, of removing sulfates from seawater in accordance with the present disclosure is shown in, and discussed with reference to, FIG. 1. As shown in FIG. 1, method 100 initially includes immersing a barium adsorbent in produced water 102. The produced water may be water produced from an oil or gas well. In one or more embodiments the produced water has a high concentration of barium ions. For example, the produced water may include barium ions in a concentration ranging from about 1 to about 5,000 ppm.

In one or more embodiments, the produced water may be alkaline, and as such, may have a pH ranging from 7 to 10. For example, the produced water may have a pH ranging from a lower limit of one of 7.0, 7.2, 7.4, 7.6, 7.8, and 8.0 to an upper limit of one of 8.0, 8.2, 8.4, 8.6, 8.8, 9, 9.2, 9.4, 9.6, 9.8 and 10.0, where any lower limit may be paired with any mathematically compatible upper limit.

In order to ensure sufficient alkalinity, one or more alkaline agents may be added to the produced water. Suitable alkaline agents that may be added to the produced water include, but are not limited to, NaOH, KOH, NaHCO$_3$, and combinations thereof. Such alkaline agents may be added to the produced water such that its pH is in the range of 7 to 10. Such pH may facilitate the mechanism of action of the barium adsorbent, namely, adsorbing barium ions.

Suitable barium adsorbents may be composed of aluminum silicate, for example. Other adsorbents may also be used, such as boron nitride. The effectiveness of a particular adsorbent may depend upon the pH of the produced water, available surface area of the adsorbent, the affinity of the adsorbent with water/dispersibility of the adsorbent in the water phase, the surface charge of the adsorbent, and/or the microstructure of the adsorbent. Nano- or micro-sized adsorbent particles may be used in some embodiments.

The aluminum silicate may be derived from aluminum oxide ($Al_2O_3$) and silicon dioxide ($SiO_2$). In one or more embodiments, the barium adsorbent is an aluminum silicate represented by chemical formula (1), below:

$$xAl_2O_3 \cdot ySiO_2 \cdot zH_2O \quad (1)$$

where x is 1-4, y is 1-4 and z is 0-10.

The barium adsorbent in accordance with the present disclosure may be in the form of particles, flakes, or fibers, among others. Typical barium adsorbents may have an average diameter ranging from 100 nm to 50 m. For example, in one or more embodiments, the barium adsorbent may have an average diameter ranging from a lower limit of one of 100, 250, 500, 750, and 1,000 nm to an upper limit of one of 5, 10, 15, 25, 35, and 40 m, where any lower limit may be paired with any mathematically compatible upper limit.

In method 100, while the barium adsorbent is immersed in the produced water, barium ions may be adsorbed to the barium adsorbent 104. The barium adsorbent may be capable of adsorbing barium ions in a concentration ranging from 6.0 to 12.0 mg/g. For example, in one or more embodiments, the barium adsorbent is capable of adsorbing barium ions in a concentration ranging from a lower limit of one of 6.0, 6.5, 7.0, 7.5, 8.0, 8.5, and 9.0 mg/g to an upper limit of one of 9.0, 9.5, 10.0, 10.5, 11.0, 11.5, and 12.0 mg/g, where any lower limit may be paired with any mathematically compatible upper limit. Accordingly, after being immersed in the produced water, the barium adsorbent may contain adsorbed barium ions in a concentration ranging from about 6.0 to 12.0 mg/g.

Then, in method 100, the barium adsorbent containing adsorbed barium ions is immersed in an acidic solution 106. The acidic solution includes water and an acid. Suitable acids that may be present in the acidic solution include, but are not limited to, HCl, $HNO_3$, HCOOH, $CH_3$HCOOH, and combinations thereof. A suitable acid may be added to water such as, for example, deionized or distilled water, in an amount such that the acidic solution has a pH ranging from 3.0 to 7.0. In one or more embodiments, for example, the acidic solution has a pH ranging from a lower limit of one of 3.0, 3.5, 4.0, 4.5, and 5.0 to an upper limit of one of 5.0, 5.5, 6.0, 6.5, and 7.0 where any lower limit may be paired with any mathematically compatible upper limit.

The acidic solution may have a low concentration of sulfate ions. For example, the concentration of sulfate ions in the acidic solution may be less than 200 ppm. In one or more embodiments, the acidic solution has a concentration of sulfate ions less than 200 ppm, less than 175 ppm, less than 150 ppm, less than 125 ppm, less than 100 ppm, and even less than 75 ppm.

In one or more embodiments, although the acidic solution has a low concentration of sulfate ions, the solution has a total dissolved solids content ranging from 10,000 to 60,000 ppm. For example, in one or more embodiments, the total dissolved solids content of the acidic solution ranges from a lower limit of one of 10,000, 15,000, 20,000, 25,000, and 30,000 ppm to an upper limit of one of 35,000, 40,000, 45,000, 50,000, 55,000, and 60,000 ppm, where any lower limit may be paired with any mathematically compatible upper limit.

By immersing the barium adsorbent in an acidic solution, the adsorbed barium may be released from the barium adsorbent thereby providing an acidic solution containing barium ions. The barium ions may be partially or completely released from the barium adsorbent and into the acidic solution. Accordingly, after the barium ions are released from the adsorbent, the acidic solution may have a concentration of barium ions ranging from 10 to 7000 ppm.

Finally, in method 100, the acidic solution containing barium ions is combined with seawater 108. Seawater from any natural source may be used in methods in accordance with the present disclosure. The seawater may contain sulfate ions in a concentration ranging from 1,000 to 5,000 ppm. For example, in one or more embodiments, the seawater that is combined with an acidic solution containing barium ions includes a sulfate ion concentration ranging from a lower limit of one of 1,000, 1,500, 2,000, 2,500, and 3,000 ppm to an upper limit of one of 3,000, 3,500, 4,000, 4,500, and 5,000 ppm where any lower limit may be paired with any mathematically compatible upper limit.

The seawater may have a total dissolved solids content ranging from 10,000 to 60,000 ppm. For example, in one or more embodiments, the total dissolved solids content of the seawater ranges from a lower limit of one of 10,000, 15,000, 20,000, 25,000, and 30,000 ppm to an upper limit of one of 35,000, 40,000, 45,000, 50,000, 55,000, and 60,000 ppm, where any lower limit may be paired with any mathematically compatible upper limit.

In one or more embodiments, combining the acidic solution containing barium ions with seawater containing from 1,000 to 5,000 ppm sulfate ions results in the precipitation of barium sulfate ($BaSO_4$). $BaSO_4$ may be precipitated in an amount ranging from 20 to 12,000 ppm.

In one or more embodiments, the precipitated $BaSO_4$ may be filtered out of the seawater using filtration techniques known in the art. Accordingly, method 100 may provide treated seawater having a sulfate ion concentration ranging from 50 to 200 ppm. Such low sulfate seawater may be used in various oil and gas applications such as, for example, as an aqueous-base fluid for injection fluids including hydraulic fracturing fluids, acidizing fluids, drilling fluids, among others. In particular embodiments, the treated seawater is mixed with a hydraulic fracturing fluid.

Accordingly, method 100 may be carried out on site, i.e., at the wellsite where the produced water originated, at the wellsite where the treated seawater is subsequently used, or both. The method may be carried out on site via a batch process, a semi-batch process, or a continuous process. For example, in a batch process, a single vessel may be used, and the various components of the chemical process are added to the vessel via pumps. In embodiments in which a batch process is used, the barium adsorbent may be disposed in a vessel and activated if necessary. In some embodiments, the barium adsorbent is poured into the vessel as particles and may be cyclically used, adsorbing barium from produced water and being regenerated by acid solution, as described above. The produced water would be added to the vessel and held for the desired residence time for the adsorption to occur. In some embodiments, a flow of air is injected into the vessel through an inlet to make a vortex in the solution, so that the barium adsorbent can disperse and fully contact with the solution for a good adsorption or desorption efficiency. A screen or other mechanism may be used to retain the adsorbent particles in the vessel as it is filled for contact with the liquid (produced water or acid solution) and the products (produced water having a diminished barium content or the acid solution having an enhanced barium content) drained/pumped/pressured out of the vessel to a holding vessel or to the next step in the process (mixing of the acid solution with seawater to form a sulfate reduced seawater, etc.). The barium adsorbent is poured into the vessel as particles. A flow of air is injected into the vessel through an inlet to make a vortex in the solution, so that the barium adsorbent can disperse and fully contact with the solution for a good adsorption or desorption efficiency. After suitable adsorption of barium ions, the produced water may be removed, e.g., via pumping, draining, or pressuring, from the vessel and the acidic solution added. Upon release of the barium ions into the acidic solution, the adsorbent may be removed from the vessel and the seawater added.

In one or more embodiments, the method is carried out on site via a semi-batch process. In such embodiments, one vessel may contain the barium adsorbent through which the produced water and acidic solutions are passed sequentially to efficiently adsorb then desorb the barium ions, respectively. Accordingly, filtration of the various solution simply occurs by draining the vessel. Then, the acidic solution may be pumped into a second vessel that contains seawater. After precipitation of barite in the second vessel, the seawater may be filtered out and directly used in an injection fluid.

Alternatively, in one or more embodiments, the method is carried out on site via a continuous process. In such embodiments, multiple vessels and intermediate separators, e.g., centrifuges, are fluidly connected and the various fluids, i.e., produced water, acidic solution, and seawater, are pumped through the system to ultimately provide treated seawater having a sufficiently low concentration of sulfate ions. In some embodiments, continuous processes may include fluidized beds for contacting the adsorbent with the produced water, a separator to separate the barium-rich adsorbent from the barium diminished produced water, then a vessel for contacting the barium rich adsorbent with the acid solution followed by a separator for separating the regenerated adsorbent from the barium enriched acid solution, along with additional vessel for contacting the seawater with the acid solution.

Figure 2:
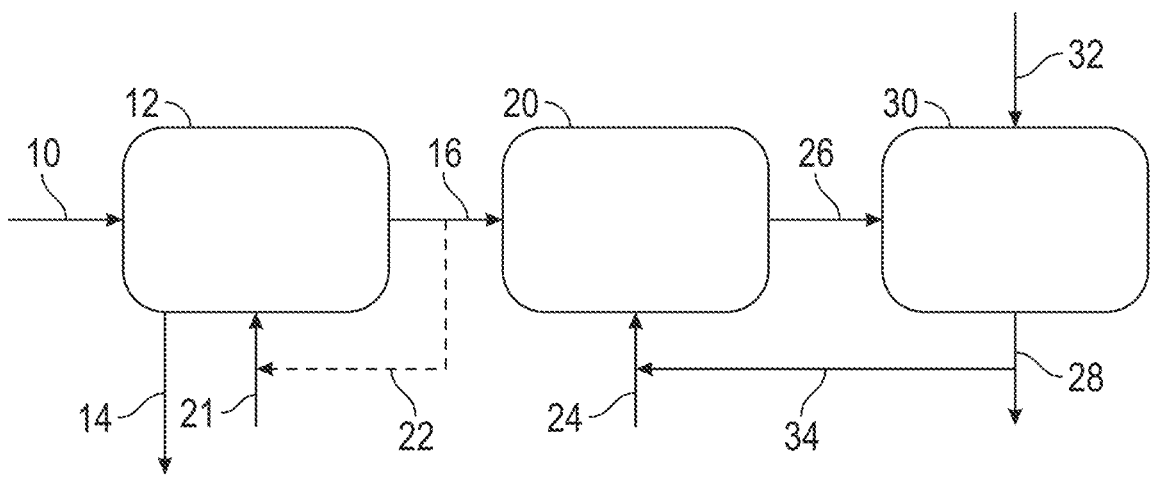
FIG. 2 is a schematic diagram of barium adsorbent regeneration in a method in accordance with one or more embodiments of the present disclosure.

In a batch, semi-batch or continuous process, desorption of the barium ions from the barium adsorbent may regenerate the barium adsorbent. Accordingly, a single barium adsorbent may be reused multiple times. For example, a barium adsorbent may be used to adsorb barium from produced water as many as five times. A barium regeneration scheme in accordance with the present method is shown in FIG. 2. In this process, produced water 10 and fresh barium adsorbent 21 combine in the barium recovery reactor 12, resulting in an outflow of barium-removed produced water 14 and a separate flow of barium-attached adsorbent 16. In one or more embodiments, a recycled barium-attached adsorbent 22 may be regenerated (not illustrated) and recycled to the barium recovery reactor 12.

This barium-attached adsorbent 16 is combined with a low sulfate acid solution 24 in a mixing tank 20 to form a high barium solution 26, which feeds into the BaSO$_4$ formation reactor 30. Seawater enters the BaSO$_4$ formation reactor 30 in a separate seawater feed stream 32. The final product of the BaSO$_4$ formation reactor 30 is sulfate-removed seawater 28. A portion of the sulfate-removed seawater 28 may be fed via flow line 34 and mixed with the low sulfate acid solution 24. The sulfate-removed seawater in flow line 34 may act a diluent for the low sulfate acid solution 24.

In some embodiments, the system includes two reactors (the first in the series is for barium adsorption/desorption reactor 12 and the second in the series is the BaSO$_4$ formation reactor 30 for forming barite), a filter to separate resultant water and formed barite (not illustrated), a tank for produced water storage (not illustrated), a tank for seawater storage (not illustrated), and a tank for sulfate removed seawater storage and fracturing fluid preparation (not illustrated). Pumps inject the water into the reactors. In the barium recovery reactor 12, a mechanical stirrer or air-driven agitation from the side wall (inducing a vortex) mixes the barium-attached adsorbent 16 and the low sulfate acid solution 24. An air outlet is needed to ensure the vessel pressure remains at, or near, 1 atm. This process includes at least one water injection inlet and one outlet with a valve and screen. In some embodiments, up to three reactors can be installed in series or parallel to improve the adsorption/desorption efficiency instead of the single barium recovery reactor 12 as illustrated. The barium concentration can be analyzed from the reactor output. Fluid inlets of high barium water 26 and seawater 32 are pumped into the BaSO$_4$ formation reactor 30 at different flow rates (based on the barium concentration) to ensure the sulfate concentration in the resultant water is <200 ppm. This reactor is mechanically stirred to ensure full mixing. This reaction generates BaSO$_4$ precipitation. There is an outlet at the bottom of the BaSO$_4$ formation reactor 30 with a filter to separate the barite. The filter is connected to the tank for fracturing fluid preparation and/or other oilfield applications.

Accordingly, embodiments of the present disclosure provide at least the following advantages. Methods of removing sulfate from seawater described herein are cost-effective, efficient, and environmentally friendly, as they provide the reuse of the barium adsorbent and the repurposing of seawater on site.

EXAMPLES

The hydrated aluminum silicate clay adsorbent used was F100, supplied by Shanghai Cheeshine Materials, China. The inductively coupled plasma mass spectrometer (ICPMS) was supplied by Agilent Technologies (manufactured in Japan).

Different Barium Concentrations

Figure 3:
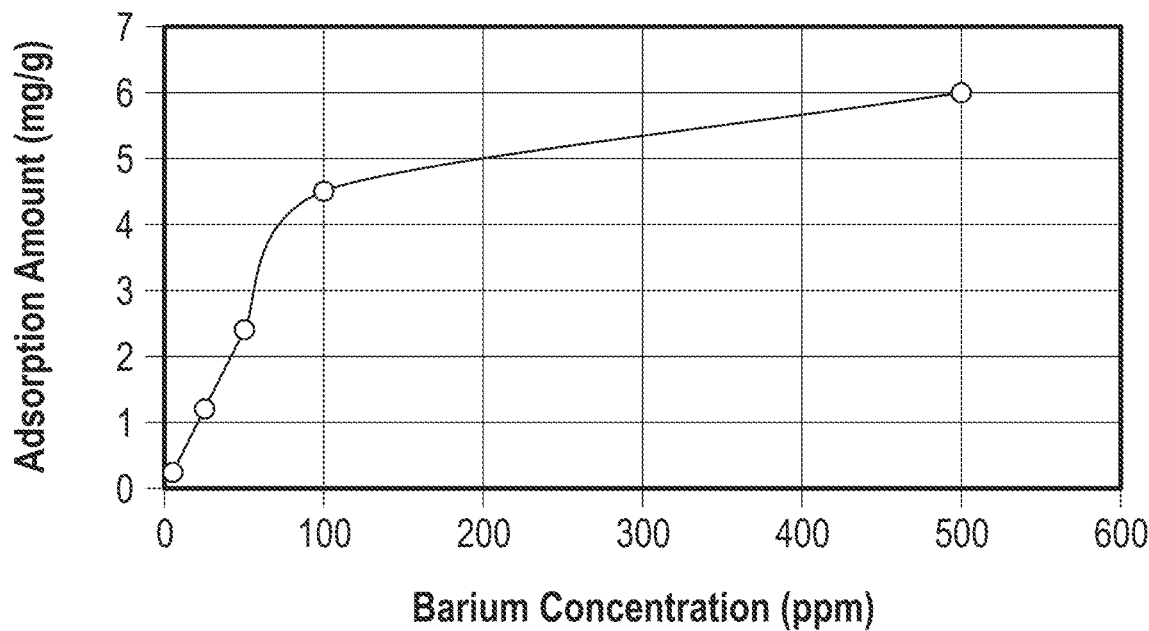
FIG. 3 is a graph of barium adsorption at pH 7 in accordance with one or more embodiments of the present invention.

The adsorption of barium on a hydrated aluminum silicate clay adsorbent F100 in deionized water at pH=7 with barium concentration of 5 ppm, 10 ppm, 50 ppm, 100 ppm and 500 ppm, respectively, was tested. The solution volume was 10 mL and the amount of adsorbent F100 added was 0.2 g. After 2 hours of adsorption, F100 was removed by centrifugation at 5000 G for 10 minutes. The adsorbed barium concentration was analyzed using inductively coupled plasma mass spectrometer. The resultant amount of barium ions adsorbed to the aluminum silicate barium adsorbent was 0.24 mg/g, 1.2 mg/g, 2.4 mg/g, 4.5 mg/g and 6.0 mg/g, respectively. The results are shown in FIG. 3.

Example 2

Figure 4:
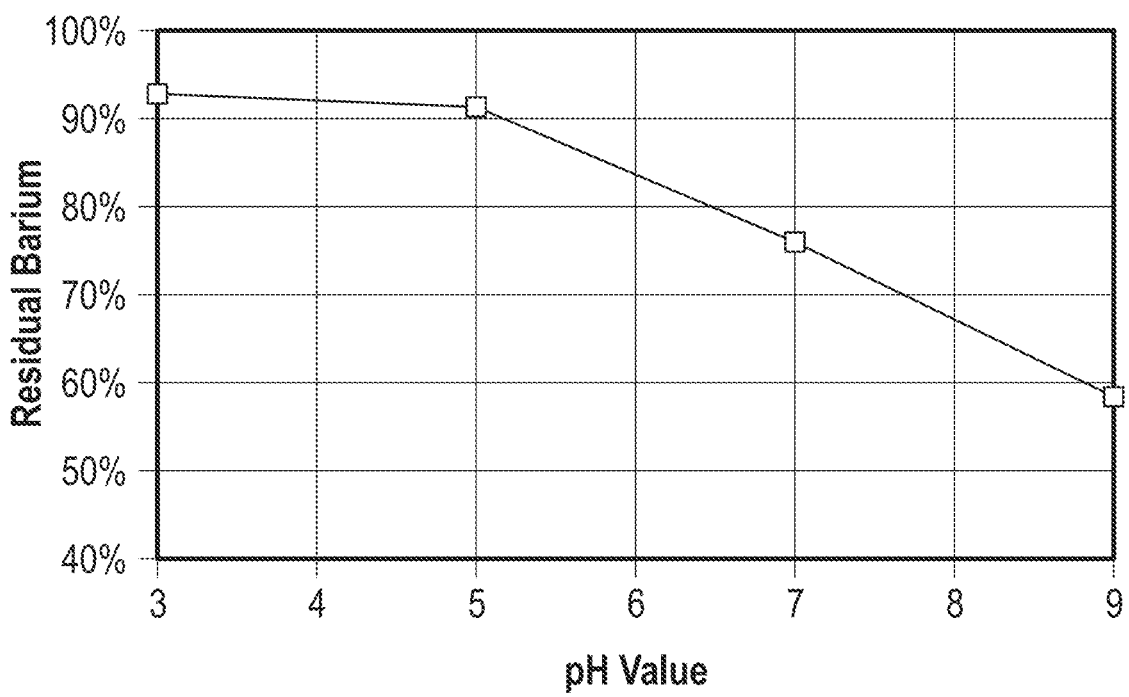
FIG. 4 is a graph of barium concentration in produced water after immersion of a barium adsorbent at various pH values in accordance with one or more embodiments of the present invention.

The adsorption of barium on F100 in deionized water having a barium concentration of 500 ppm and a pH of 3, 5, 7 and 9, respectively. The solution volume was 10 mL and the amount of F100 was 0.2 g. After 2 hours of adsorption, F100 was removed by centrifugation at 5000 G for 10 minutes. The barium concentration was analyzed using ICPMS. FIG. 4 shows the residual barium concentration in solutions after adsorption. When the pH was 3, more than 90% barium was left in solution, indicating there is seldom barium captured by F100. With the increase of pH, the residual concentration of barium greatly decreased. When pH was 9, almost half barium was captured by F100. The results show that the adsorption efficiency of barium on F100 was low at acid condition and high at alkaline condition. Thus, F100 may be used for barium capture in produced water at neutral or basic pH conditions and barium release for precipitation at acidic pH condition.

Example 3

Figure 5:
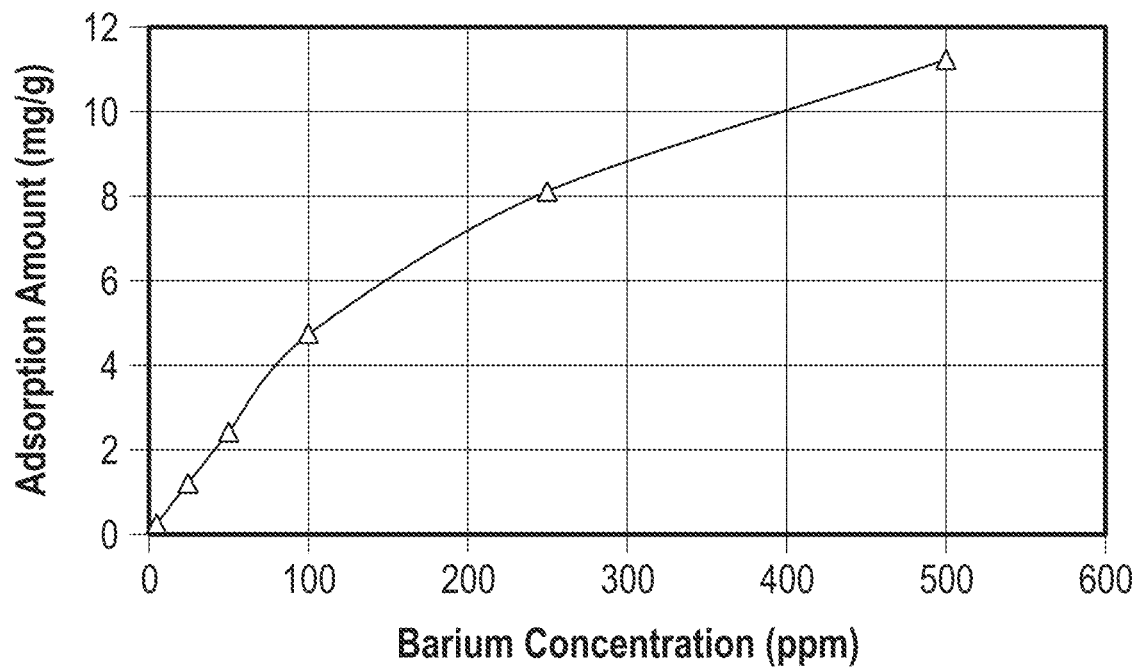
FIG. 5 is a graph of barium adsorption at pH 9 in accordance with one or more embodiments of the present invention.

The adsorption of barium on F100 in deionized water at pH=9 with barium concentration of 5 ppm, 10 ppm, 50 ppm, 100 ppm, 250 ppm and 500 ppm, respectively, was tested. NaOH was used to adjust the pH value. The solution volume was 10 mL and the amount of F100 was 0.2 g. After 2 hours of adsorption, F100 was removed by centrifugation at 5000 G for 10 mins. The barium concentration was analyzed using ICPMS. The resultant adsorption amount was 0.24 mg/g, 1.2 mg/g, 2.4 mg/g, 4.7 mg/g, 8.1 mg/g and 11.2 mg/g, respectively. The results are shown in FIG. 5. By comparing FIG. 3 and FIG. 5, is can be seen that the adsorption amount was higher when pH was 9, especially at high barium concentration.

Example 4

The desorption of barium from F100 using the sample from Example 3 that contained 11.2 mg/g adsorbed barium was tested. The F100 sample containing adsorbed barium was immersed in 2 mL deionized water. The pH was adjusted to 5 using HNO3. Then, the F100 sample was removed by centrifugation at 5000 G for 10 minutes. The supernatant with barium was collected. The supernatant was mixed with seawater having a concentration of sulfate ions of 4,290 ppm and a total dissolved solids content of 57,600 ppm. Immediately after the two solutions were mixed, the mixture became turbid, indicating the precipitation of $BaSO_4$.

Example 5

Figure 6:
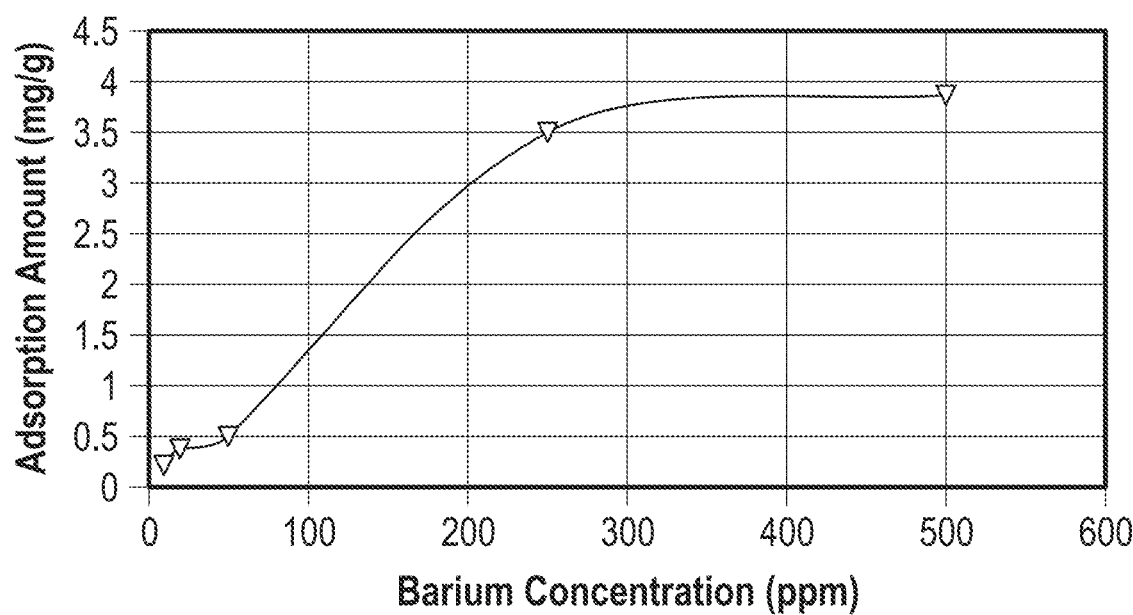
FIG. 6 is a graph of barium adsorption from synthetic produced water at pH 9 in accordance with one or more embodiments of the present disclosure.

The adsorption of barium on F100 in synthetic produced water at pH=9 with barium concentration of 10 ppm, 20 ppm, 50 ppm, 250 ppm and 500 ppm, respectively was tested. The composition of synthetic produced water was 31.2 g/L NaCl, 42.6 g/L, $CaCl_2 \cdot 2H_2O$ and 13.9 g/L $MgCl_2 \cdot 6H_2O$. The pH value pf the synthetic produced water was adjusted by adding NaOH. The solution volume was 10 mL and the amount of F100 was 0.2 g. After 2 hours of adsorption, F100 was removed by centrifugation at 5000 G for 10 minutes. The barium concentration was analyzed using ICPMS. The resultant adsorption of barium was 0.22 mg/g, 0.39 mg/g, 0.50 mg/g, 3.5 mg/g and 3.9 mg/g, respectively. The results are shown in FIG. 6.

Example 6

The adsorption of barium on a flake shaped hydrated aluminum silicate clay TNK (supplied by Shanghai Cheeshine Materials, China) in deionized water at pH=7 with barium concentration of 500 ppm was tested. The solution volume was 10 mL and the amount of adsorbent TNK added was 0.2 g. After 2 hours of adsorption, TNK was removed by centrifugation at 5000 G for 10 minutes. The barium concentration before and after adsorption was analyzed using inductively coupled plasma mass spectrometer. The resultant amount of barium ions was the same before and after contact with TNK, indicating the flake shape material is not suitable as barium adsorbent.

Example 7

The adsorption of barium on a nanomaterial boron nitrite (BN) in deionized water at pH=7 with barium concentration of 500 ppm was tested. The solution volume was 10 mL and the amount of adsorbent BN added was 0.2 g. After 2 hours of adsorption, BN was removed by centrifugation at 5000 G for 10 minutes. The barium concentration before and after adsorption was analyzed using inductively coupled plasma mass spectrometer. The resultant adsorption of barium ions was 5.5 mg/g, indicating the adsorption on BN is not as effective as F100. The likely cause of this is that the material is neutral and has poor dispersibility in water.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

The invention claimed is:

1. A method of removing sulfates from seawater, the method comprising:
    immersing a barium adsorbent in produced water combined with an alkaline agent selected from the group consisting of KOH, $NaHCO_3$, and combinations thereof, wherein the produced water comprises barium ions and has a pH ranging from 7 to 10;
    adsorbing the barium ions from the produced water on the barium adsorbent thereby forming adsorbed barium ions;
    mixing the barium adsorbent comprising the adsorbed barium ions in an acidic solution such that the adsorbed barium ions are released from the barium adsorbent to provide an acidic solution containing barium ions; and
    combining the acidic solution containing barium ions with seawater to precipitate the sulfate as barium sulfate ($BaSO_4$).

2. The method of claim 1, wherein the produced water comprises barium ions in a concentration ranging from 1 to 5,000 ppm.

3. The method of claim 1, wherein the barium adsorbent is aluminum silicate.

4. The method of claim 3, wherein the aluminum silicate is represented by chemical formula (1):

$$xAl_2O_3 \cdot ySiO_2 \cdot zH_2O \qquad (1)$$

wherein x is 1-4, y is 1-4 and z is 0-10.

5. The method of claim 1, wherein the barium adsorbent is in the form of a particle, a flake, or a fiber.

6. The method of claim 5, wherein the barium adsorbent is in the form of a particle that has an average diameter ranging from 100 nm to 50 μm.

7. The method of claim 1, wherein the barium adsorbent comprising the adsorbed barium ions comprises barium in an amount ranging from 6.0 to 12.0 mg/g.

8. The method of claim 1, wherein the acidic solution comprises water and has a pH ranging from 3 to 7.

9. The method of claim 8, wherein the acidic solution further comprises an acidic agent selected from the group consisting of HCl, $HNO_3$, HCOOH, $CH_3HCOOH$, and combinations thereof.

10. The method of claim 1, wherein, the acidic solution has a sulfate concentration of less than 200 ppm.

11. The method of claim 1, wherein the seawater has a sulfate concentration ranging from 1,000 to 5,000 ppm.

12. The method of claim 1, further comprising, after combining the acidic solution containing barium ions with the seawater to precipitate $BaSO_4$, filtering the precipitated $BaSO_4$ out of the seawater to provide treated seawater.

13. The method of claim 12, further comprising mixing the treated seawater with one or more additives to form an injection fluid for use in oil and gas applications.

14. The method of claim 13, wherein the injection fluid is a hydraulic fracturing fluid.

15. A method, comprising:
  recovering produced waters comprising barium ions from an underground reservoir;
  adjusting a pH of the produced waters to a pH in a range from 7 to 10 to form a pH adjusted produced water using an alkaline agent selected from the group consisting of KOH, $NaHCO_3$, and combinations thereof;
  contacting the pH adjusted produced water with a barium adsorbent to produce a barium adsorbent comprising adsorbed barium ions and a produced water having a reduced barium content;
  contacting the barium adsorbent comprising adsorbed barium ions with an acidic solution to produce an acidic solution comprising barium ions and a regenerated barium adsorbent; and
  mixing the acidic solution containing barium ions with seawater comprising sulfate ions to recover a barium sulfate precipitate and a reduced sulfate seawater.

16. The method of claim 15, further comprising mixing the reduced sulfate seawater with one or more additives to form an injection fluid and injecting the injection fluid into an underground reservoir.

17. The method of claim 15, further comprising feeding the regenerated barium adsorbent as the barium adsorbent in the step of contacting the pH adjusted produced water with a barium adsorbent.

18. The method of claim 15, wherein the acidic solution has a pH in a range from 3 to 7 and comprises water and an acidic agent selected from the group consisting of HCl, $HNO_3$, HCOOH, $CH_3HCOOH$, and combinations thereof.

* * * * *